US 8,402,833 B2
Mar. 26, 2013

(12) United States Patent
Alfano

(10) Patent No.: US 8,402,833 B2
(45) Date of Patent: Mar. 26, 2013

(54) STEPPER MOTOR GAUGE

(75) Inventor: Bryan Alfano, Manchester, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 150 days.

(21) Appl. No.: 13/052,927

(22) Filed: Mar. 21, 2011

(65) Prior Publication Data
US 2012/0240685 A1    Sep. 27, 2012

(51) Int. Cl.
G01L 7/00    (2006.01)
(52) U.S. Cl. ......................................... 73/700
(58) Field of Classification Search ............ 73/700–756
See application file for complete search history.

(56) References Cited

U.S. PATENT DOCUMENTS

| 5,335,511 | A |   | 8/1994 | McKeown |  |
|---|---|---|---|---|---|
| 5,362,210 | A |   | 11/1994 | Richardson, Jr. |  |
| 5,408,840 | A |   | 4/1995 | Talley |  |
| 5,665,897 | A |   | 9/1997 | Lippmann et al. |  |
| 5,673,563 | A |   | 10/1997 | Albertson et al. |  |
| 5,729,991 | A |   | 3/1998 | Albertson et al. |  |
| 5,768,895 | A |   | 6/1998 | Albertson et al. |  |
| 5,783,939 | A | * | 7/1998 | Lippmann et al. | ........ 324/154 R |
| 6,498,453 | B1 | * | 12/2002 | King et al. | .................... 318/701 |
| 7,437,941 | B1 |   | 10/2008 | Ward |  |
| 2006/0266273 | A1 | * | 11/2006 | Westberg et al. | ............ 116/62.1 |
| 2010/0162822 | A1 |   | 7/2010 | Ward |  |
| 2010/0259406 | A1 |   | 10/2010 | Caso et al. |  |
| 2012/0240659 | A1 | * | 9/2012 | Alfano | ........................... 73/1.57 |
| 2012/0240684 | A1 | * | 9/2012 | Alfano | ........................... 73/714 |

FOREIGN PATENT DOCUMENTS

GB          2373574 A  *  9/2002

OTHER PUBLICATIONS

International Search Report and Written Opinion of the International Searching Authority for International Application No. PCT/US12/29841, mailed Jul. 16, 2012.

* cited by examiner

Primary Examiner — Andre Allen
(74) Attorney, Agent, or Firm — McCarter & English, LLP

(57) ABSTRACT

A gauge includes a housing and a fitting having an inlet, an internal flow path, and an outlet. A sensor is in fluidic communication with the internal flow path and measures a characteristic of a fluid in the flow path. A control unit is in electrical communication with the pressure sensor, receives an output from the pressure sensor and generates a command based on the output received. A stepper motor has a rotor shaft with an indicator needle operatively connected thereto, and is in electrical communication with the control unit. A power supply is in electrical communication with the pressure sensor, the motor and the control unit for supplying power thereto. The control unit transmits the command to the stepper motor, which receives the command from the control unit and drives the rotor shaft according to the command, displaying the sensed characteristic via the needle.

32 Claims, 7 Drawing Sheets

STEPPER MOTOR GAUGE

FIELD OF THE INVENTION

The present invention relates to stepper motor gauges, for example HVAC pressure gauges, and more particularly, relates to a stepper motor gauge which combines aspects of both digital gauges and analog gauges.

BACKGROUND INFORMATION

Gauges, such as HVAC gauges, often come in two types, digital or analog. This forces users to make a choice of using one, without having the benefits of the other. Some users prefer the appearance of an analog gauge because of the visual indicator provided thereby. However, HVAC some users like the functionality of digital gauges and the accuracy associated with these gauges.

Accordingly, it is an object of the present invention to overcome one or more of the above-described drawbacks and/or disadvantages of the prior art.

SUMMARY OF THE INVENTION

In one aspect, a gauge comprises a housing; a fitting having an inlet, an internal flow path, and an outlet; a sensor in fluidic communication with the internal flow path, the sensor adapted to measure a characteristic of a fluid in fluidic contact with the sensor and output a signal representing the value of the measured characteristic; a control unit in signal communication with the sensor, the control unit adapted to receive the output from the sensor and output a command signal based on the output of the sensor; a stepper motor adapted to rotate a rotor shaft, the stepper motor in signal communication with the control unit; a power supply in electrical communication with the pressure sensor and the control unit; and an indicator needle mounted to the rotor shaft; the control unit transmits the command signal to the stepper motor; the stepper motor receives the command signal from the control unit and drives the rotor shaft according to the command signal. In some embodiments, the command includes a drive direction.

In some embodiments of the present invention, the sensor output is an analog signal and the control unit is adapted to convert the analog signal to a digital signal. In some other embodiments, the control unit is a microcontroller. In such other embodiments, the microcontroller includes a memory unit and may include an executable program.

In some embodiments of the present invention, the sensor includes a strain gauge. In some such embodiments, the strain gauge is a piezoresistive strain gauge. In other embodiments of the present invention, the sensor is an electromagnetic sensor or a piezoelectric sensor.

In some embodiments of the present invention, the output of the sensor is a voltage. In some such embodiments, the output is a voltage in the range of 0-5 volts, while in other embodiments the output is a voltage in an amount of millivolts. In still other embodiments, the sensor output is a current in an amount of milliamps.

In some embodiments of the present invention, the power supply is a battery which may be rechargeable. In other embodiments, the power supply is an AC power supply. In some embodiments, the power supply further comprises a solar array. In some such embodiments, a rechargeable battery is in electrical communication with the solar array, and the solar array is adapted to charge the rechargeable battery.

In some embodiments of the present invention, the stepper motor may be one of a permanent magnet stepper motor, a variable reluctance stepper motor, or a hybrid stepper motor. In some such embodiments, the stepper motor further includes a driver that converts the control signals from the control unit into electrical signals to drive the stepper motor. In some embodiments, the step angle of the stepper motor may vary, for instance, in ranges of less than 2°, within the range of 5° to 10°, within the range of 10° to 45°, or greater than 45°.

In some embodiments of the present invention, the sensor comprises at least one of a pressure sensor, a temperature sensor, a force sensor, a humidity sensor, a photo optic sensor, a torque sensor, a vibration sensor, a fluid viscosity sensor, a fluid density sensor, a sound sensor, and a light sensor. In some embodiments, the gauge is a HVAC low-pressure gauge. In other embodiments, the gauge is a HVAC high-pressure gauge.

One advantage of the present invention is that it provides users with a visual indicator in the form of an analog-style gauge. Yet another advantage of the currently preferred embodiments of the present invention is that the users are provided with the accuracy and functionality of a digital gauge.

Other objects and advantages of the present invention and/or of the currently preferred embodiments thereof will become more readily apparent in view of the following detailed description and accompanying drawings.

DETAILED DESCRIPTION OF EMBODIMENTS OF THE INVENTION

Figure 1:
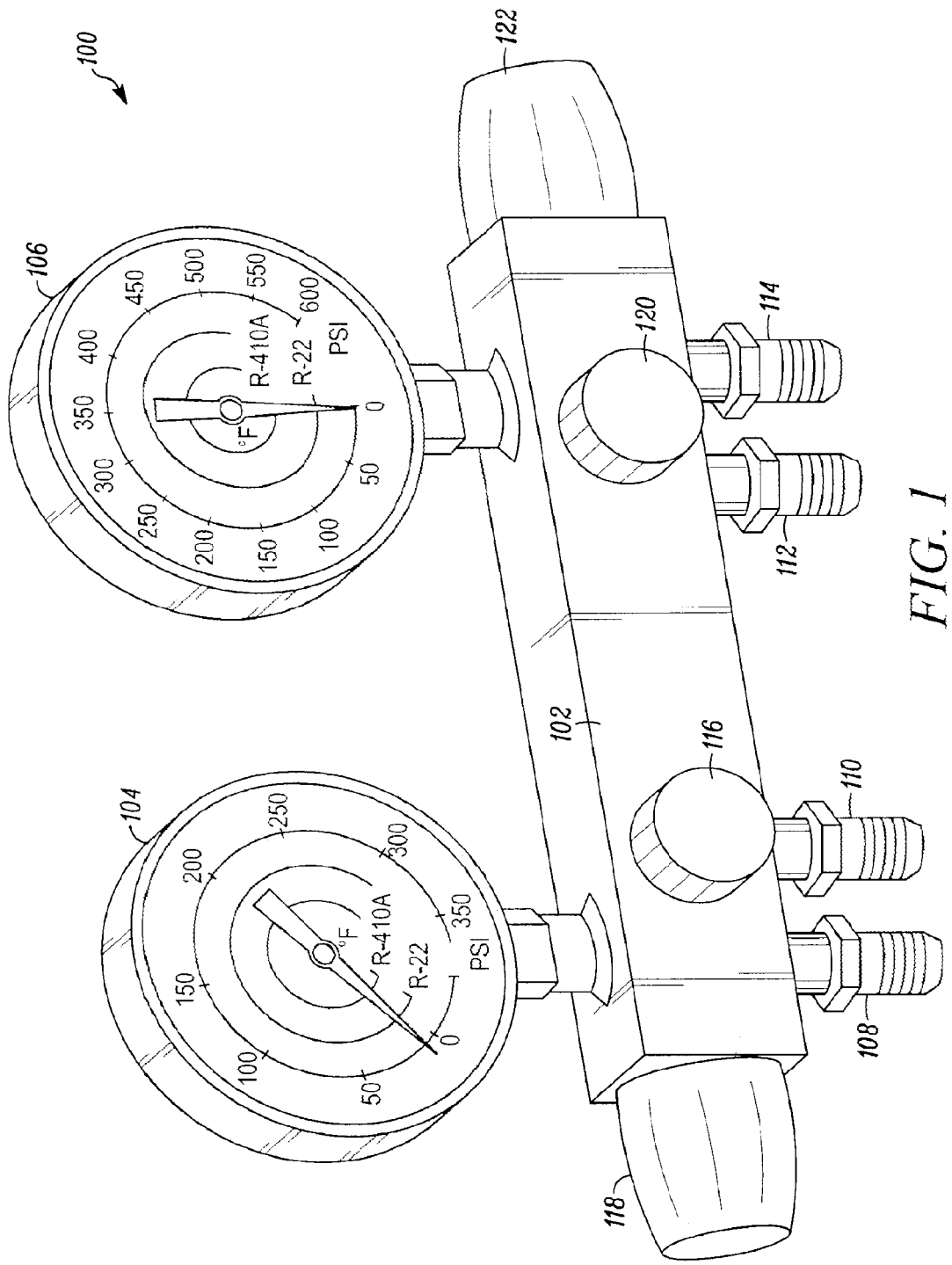
FIG. 1 is a front perspective view of a manifold system including a manifold and two gauges.

In FIG. 1, a manifold system for monitoring characteristics or physical properties of a respective system, including but not limited to an HVAC system, is indicated generally by the reference number 100. The HVAC manifold system 100 includes a manifold chamber 102 and two gauges 104, 106. The first gauge is a low-pressure gauge 104, displaying a lower maximum gauge pressure, shown in greater detail in FIG. 2, and the second gauge is a high-pressure gauge 106, displaying a higher maximum gauge pressure. The low-pressure gauge 104 and the high-pressure gauge 106 both include an analog visualization, though they involve a digital functionality, described in greater detail below. The low-pressure analog gauge 104 and the high-pressure gauge 106 display the monitored characteristics or physical properties of the respective HVAC system, such as pressure (e.g., refrigerant pressure), temperature (e.g., refrigerant temperature), or any other measurable physical property, through an analog visualization. The low-pressure gauge 104, and the high-pressure gauge 106 are connectable to the manifold chamber 102. In some embodiments, the low-pressure gauge 104 and the high-pressure gauge 106 are permanently affixed to the manifold chamber 102, while in other embodiments, the low-pressure gauge 104 and the high-pressure gauge 106 are removably attached to the manifold chamber 102. Removable attachment can be achieved through any suitable means known in the art (e.g., threading). As shown in FIG. 1, the manifold chamber 102 includes four separate inlet fittings protruding therefrom, including a low pressure inlet fitting 108, a refrigerant cylinder inlet fitting 110, a vacuum pump inlet fitting 112, and a high pressure inlet fitting 114. Further provided on the manifold chamber 102 are a plurality of handles or knobs, including a refrigerant cylinder valve knob 116, a low-pressure valve knob 118, a vacuum pump valve knob 120, and a high-pressure valve knob 122. Each handle or knob 116, 118, 120, 122 opens and closes their respective valves for placing the manifold chamber 102 and the analog gauges 104, 106 in fluid communication with the respective HVAC system. In some embodiments, the handles or knobs 116, 118, 120, 122 are torque limiting to form a secure fluid-tight seal between a respective sealing member (not shown) and the HVAC system, while substantially preventing damage to the sealing member by over-tightening.

Figure 2:
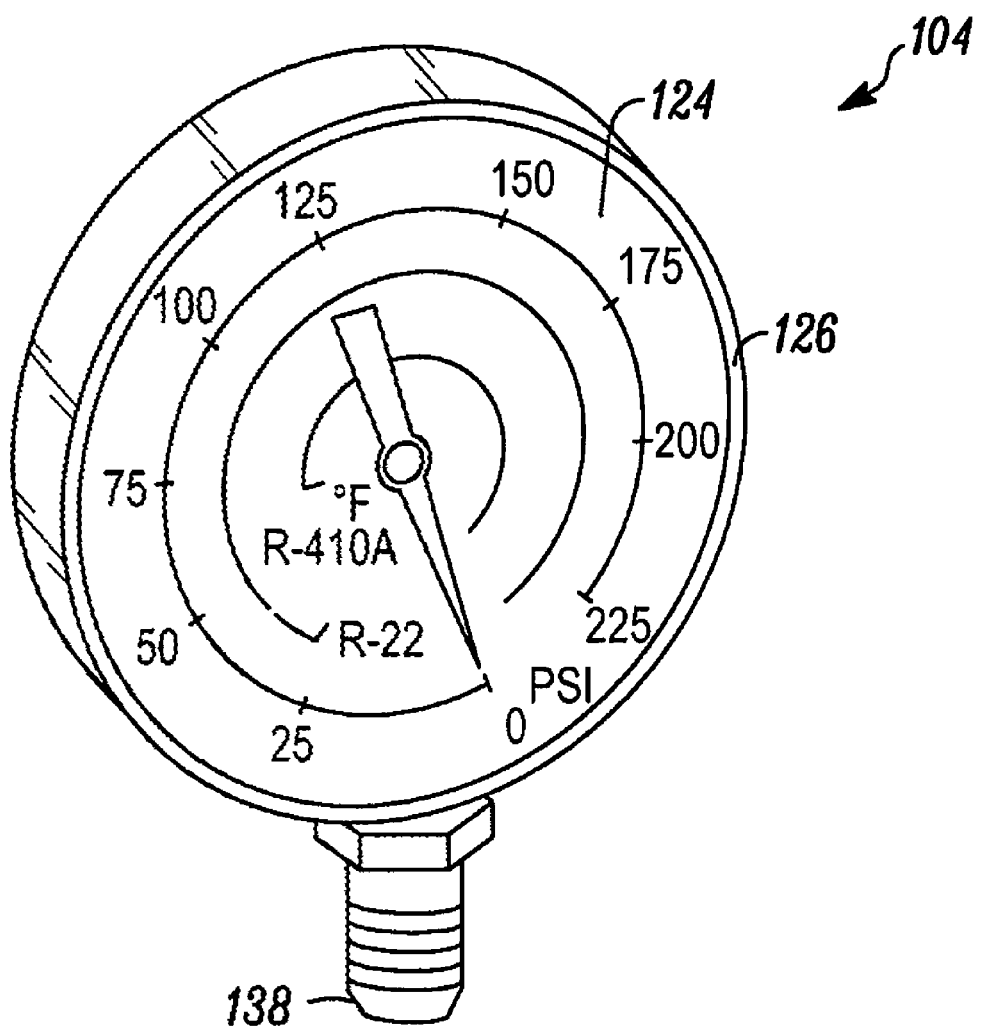
FIG. 2 is a front perspective view of a gauge embodying the present invention.
Figure 3:
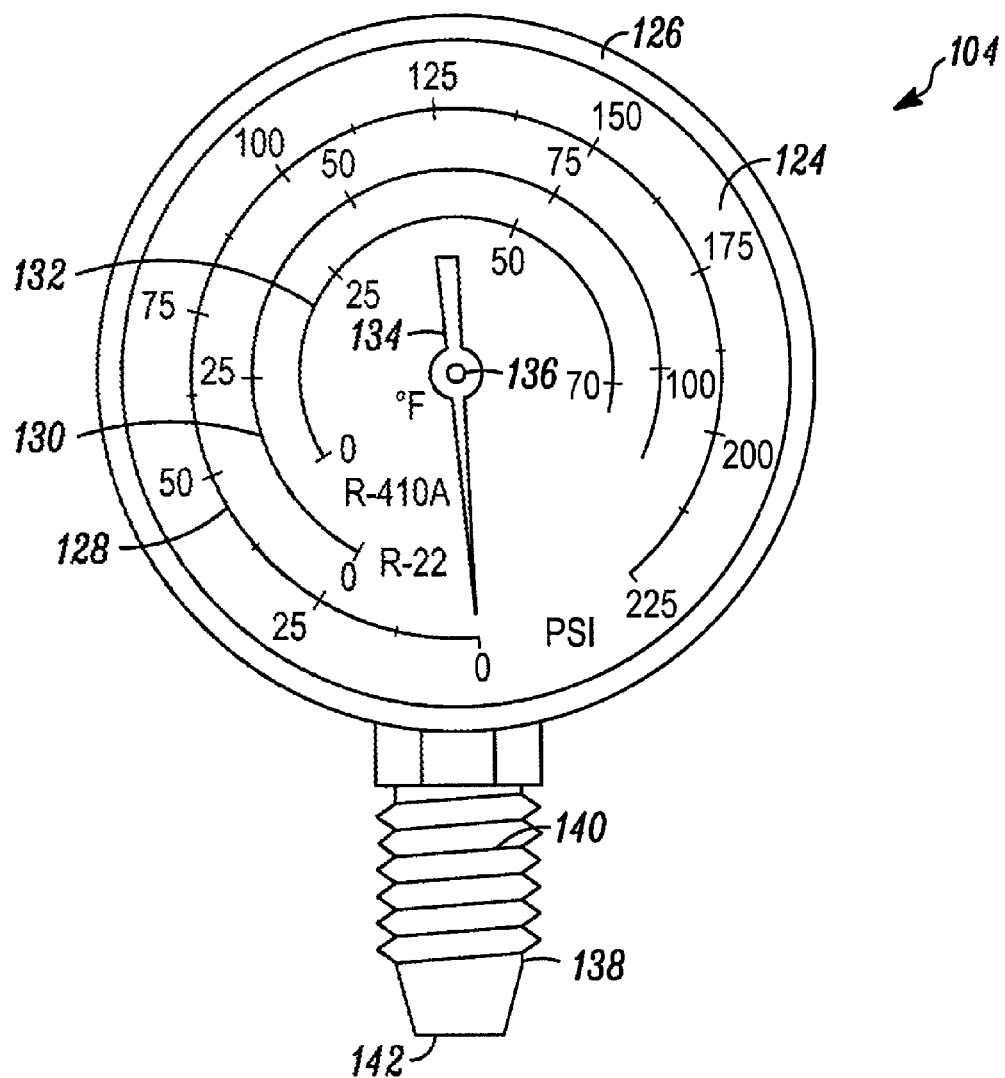
FIG. 3 is a front elevational view of the gauge of FIG. 2.

FIGS. 2 and 3 show the low-pressure gauge 104 of FIG. 1 in greater detail. Specifically, FIG. 2 is a perspective view of the low-pressure gauge 104, while FIG. 3 is a front elevational view of the low-pressure gauge 104. As shown in FIG. 2, the low-pressure gauge includes, generally, a low-pressure analog gauge face 124, a gauge bezel 126, and a low-pressure gauge fitting 138. Generally, the gauge face 124 provides a visual representation of the characteristics or physical properties of the respective HVAC system, while the gauge fitting 138 allows for fluid communication with the respective HVAC system. As shown in FIG. 3, the gauge face 124 includes a plurality of scales, including, but not limited to, a PSI scale 128, a first refrigerant temperature scale 130 (e.g., R-22), and a second refrigerant temperature scale 132 (e.g., R-410A). The respective values of the system are indicated by an indicator needle 134, which is mechanically fastened to a rotatable rotor shaft 136. Importantly, as may be recognized by those of ordinary skill in the art, the gauge may be any type of gauge configured for any type of fluid, not just those measuring the characteristics of R-22 and R-410A. As mentioned above, the low-pressure gauge 104 includes a gauge fitting 138, as shown in FIG. 3, that includes a fitting inlet 142 and has external male threading 140 for connecting to the manifold chamber 102. It should be recognized by those of ordinary skill in the art that the external male threading 140 is not present in all embodiments, as the low-pressure gauge 104 may be connected to the manifold chamber 102 through any suitable means known in the art.

Figure 4:
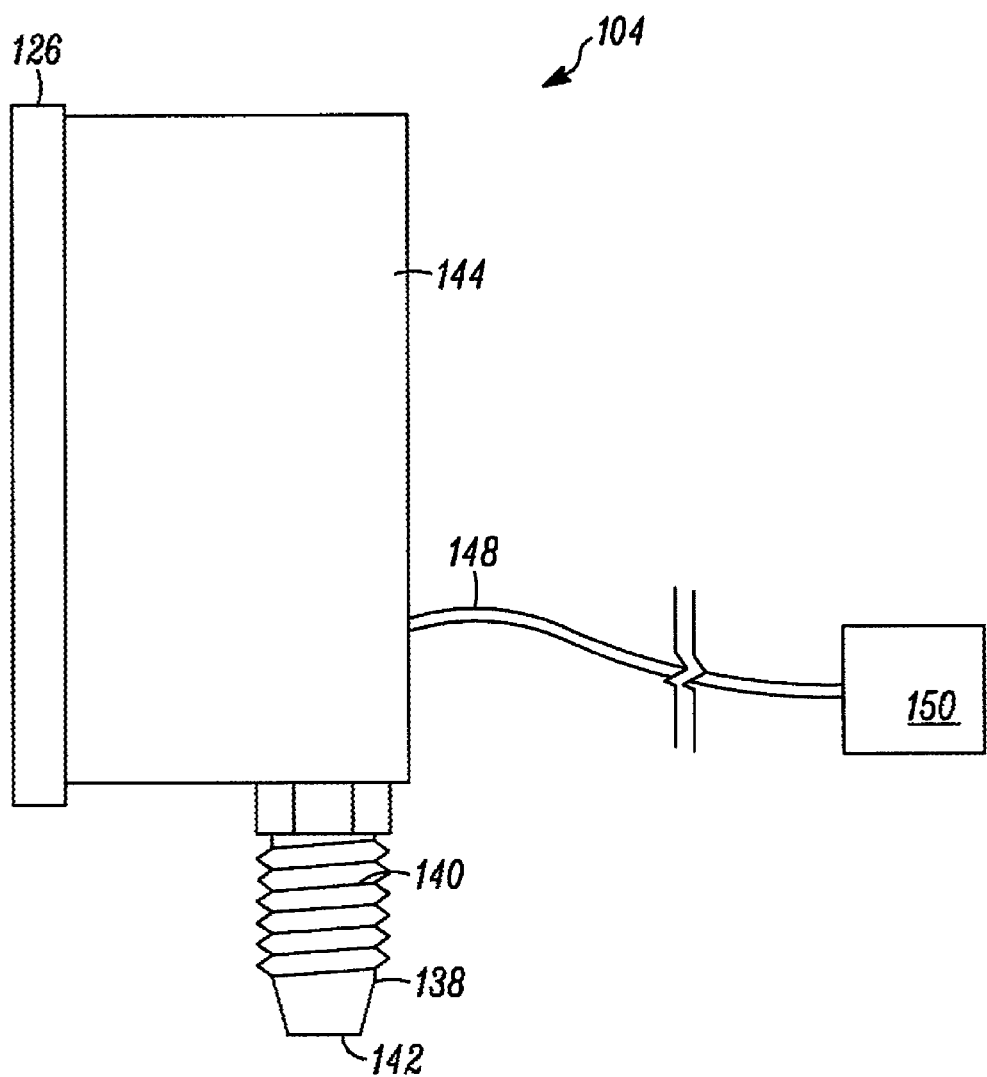
FIG. 4 is a right side elevational view of the gauge of FIG. 2.
Figure 5:
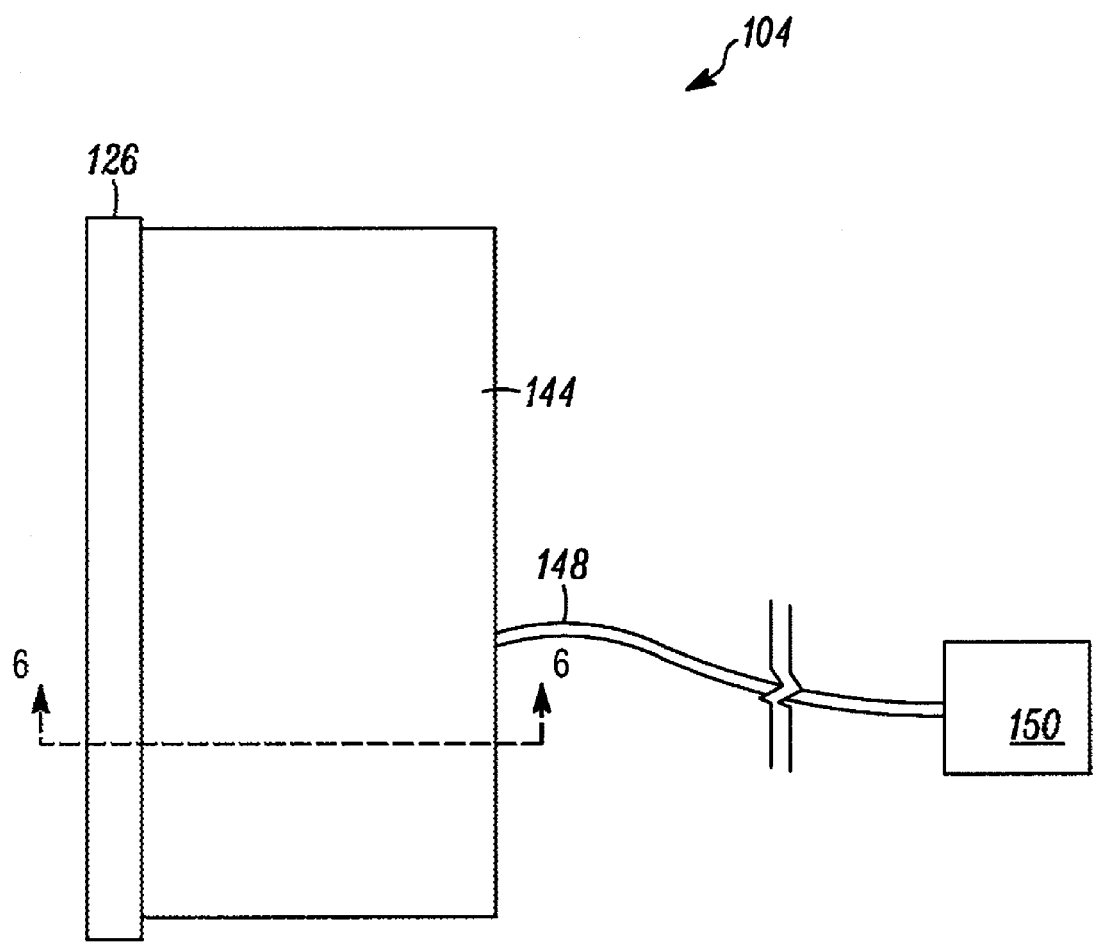
FIG. 5 is a top view of the gauge of FIG. 2.

The low-pressure gauge 104 further includes a housing 144 connected with the gauge bezel 126 and the gauge fitting 138, as shown in FIG. 4. The gauge bezel 126 is integral with the housing 144. In other embodiments, the gauge bezel 126 is removably attachable to the housing 144, and in other embodiments rotatable relative to the housing. Similarly, the gauge fitting 138 is integral with the housing 144, but in other embodiments is removably attachable thereto. The housing 144 includes a power wire 148 that extends into the interior of the housing 144 and is connected to a power source 150. The power wire 148 places the electrical components of the low-pressure gauge 102 in electrical communication with the power source 150, discussed in greater detail below.

Figure 6:
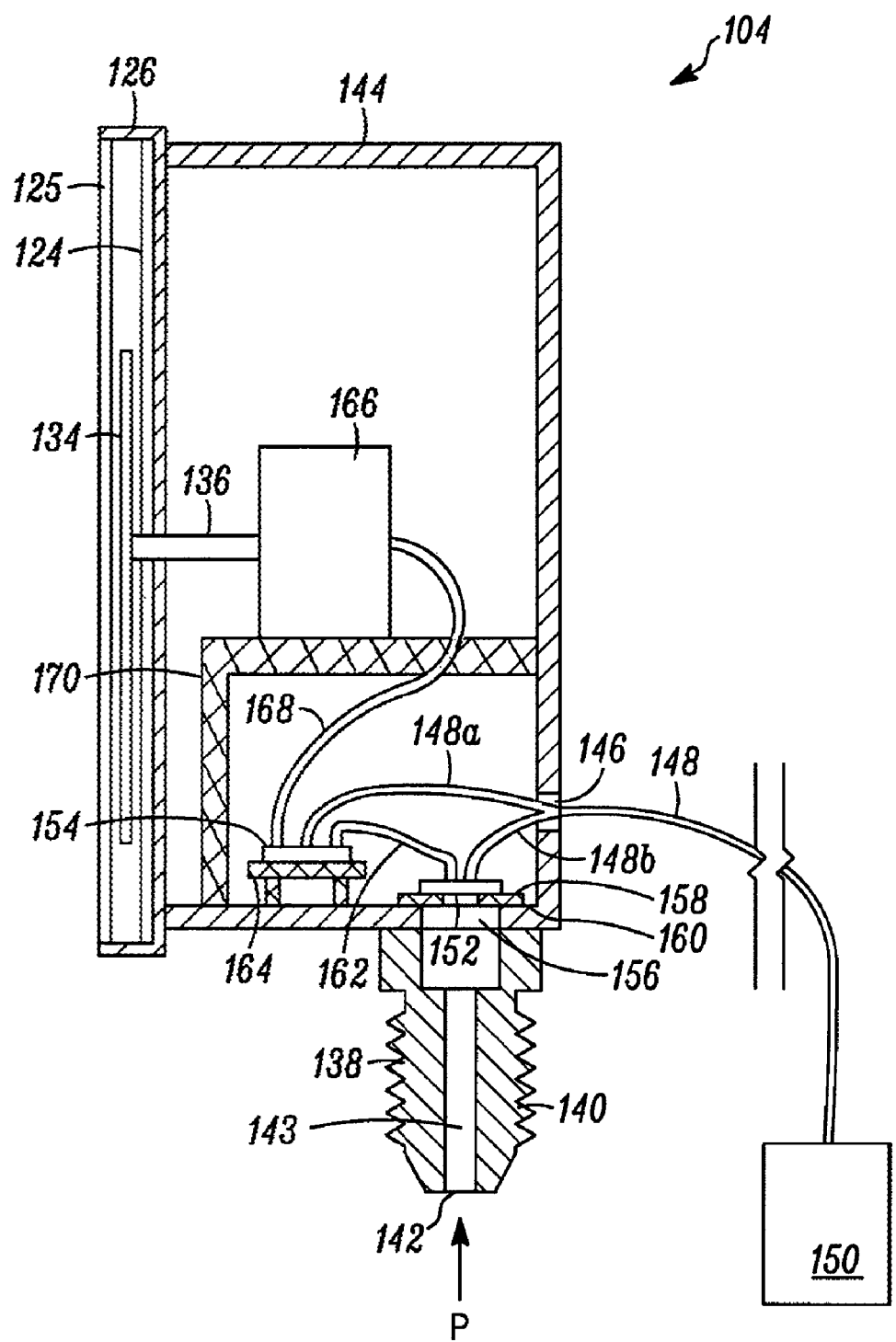
FIG. 6 is a cross-sectional view of the gauge of FIG. 2 taken along line 6-6 of FIG. 5.

Referring to FIG. 6, a cross-section of the low-pressure gauge 104 is shown. The housing 144 is generally hollow in nature and houses a pressure sensor 152, a control unit 154, a stepper motor 166, and associated supports and wiring. The housing 144 further includes a fluid inlet orifice 156 and a power wire orifice 146, each formed in a wall of the housing.

A gauge fitting 138 is attached to the housing 144 adjacent to the fluid inlet orifice 156. The gauge fitting 138 includes a fitting inlet 142, and defines a flow path 143 through the interior thereof, the flow path 143 being in fluidic communication with the fluid inlet orifice 156.

The pressure sensor 152 is secured to the interior of the housing 144 by one or more pressure sensor supports 158, which act to secure the pressure sensor 152 when it is contacted by fluid pressure. The pressure sensor 152 is secured by the pressure sensor supports 158 in fluidic communication with the fluid inlet orifice 156, thus placing the pressure sensor 152 in fluidic communication with the manifold chamber 102. The pressure sensor 152 is of a type known in the art. Those skilled in the art will understand the types of pressure sensors that can be utilized with the invention. Specifically, in the illustrated embodiment, the pressure sensor 152 is a strain gauge pressure sensor that produces an electrical signal output ($V_{out}/I_{out}$ of FIG. 7) correlated to the pressure applied and the resulting deformation of the associated strain gauge(s)s. In some such embodiments, the strain gauge pressure sensor includes piezoresistive strain gauges. However, as should be recognized by those of ordinary skill in the pertinent art, the pressure sensor utilized in other embodiments may be any of a numerous different sensors that are currently known or that later become known, such as, but not limited to, capacitive pressure sensors, electromagnetic pressure sensors, and piezoelectric pressure sensors. The pressure sensor 152 is powered by a power source 150, which is discussed more in depth below.

The pressure sensor 152 is in electrical communication with the control unit 154, and the power source 150, each connection occurring through a respective wire 162, 168. Electrical connection between the pressure sensor 152 and the control unit 154 allows the electrical signal output of the pressure sensor 152 to be communicated to, and received by the control unit 154. The control unit 154 includes memory that stores an executable program as well as past pressure sensor 152 measurements and/or current needle 134 location. The control unit 154 generates a control command (SIGNAL of FIG. 7) based on the stored information, e.g., current needle 134 location, that drives the stepper motor 166 to indicate current measurement. Specifically, the control unit 154 receives an electrical signal output from the pressure sensor 152 (i.e., a control unit input) that represents a current pressure measurement. The control unit 154 converts the control unit input, partially based on the current needle 134 location and/or other stored information, into a drive command for, and responded to by, the stepper motor 166. The drive command includes at least one of a drive direction (e.g., clockwise, counter-clockwise) and a drive distance (e.g., five steps). As such, because the control unit 154 includes memory that saves data relating to past measurements and/or the current location of the needle 134, the control unit 154 is able to compare the current measurement with the past measurement or needle location to determine how far the stepper motor 166 must rotate the needle, and in what direction, to accurately indicate the current measurement. The control unit 154 is supported by a control unit support 164 that is attached to the interior of the housing 144.

In some embodiments, the control unit 154 includes several components, not shown, that should be readily understood by one of ordinary skill in the art. Specifically, the control unit 154 may include one or more of a printed circuit board (PCB), a controller, a microcontroller, a clock, a processor, a microprocessor, a central processing unit, memory, input/out (I/O) bus circuitry, an analog-to-digital (A/D) converter, a multiplexer (MUX), an external memory interface, and/or an expansion bus. In some such embodiments, the control unit 154 includes a control program, or control logic, for converting the control unit input into a command for controlling the stepper motor 166. In further embodiments, the control program is stored in the memory, which can be random access memory, read-only memory, hard disk, FLASH memory, or other suitable memory. Non-volatile memory for the system is provided in the memory in some embodiments. The memory, in addition to the control program, records and stores data in further embodiments. The control program, or control logic, of the control unit 154 is written in any suitable high or low level programming language, and stored as executable code. In various embodiments, the controller, microcontroller, processor, or microprocessor, whichever is integrated into the system, includes a number of general purpose, digital I/O control lines that can drive outputs or receive inputs from other devices via the I/O bus circuitry, specifically from the pressure sensor 152. Similarly, in certain embodiments, the stepper motor 166 is attached to the output of the I/P bus circuitry. In various embodiments, the components mentioned above are provided in a single, commercially-available integrated circuit, or are designed and provided separately.

The stepper motor 166 is supported by a stepper motor support 170, and includes a rotor shaft 136 and a wire 168 for communication between the controller 154 and the motor 166. The stepper motor support 170 is secured to the interior of the housing 144, which secures the stepper motor 166 from movement and places the stepper motor 166 in a substantially central location of the housing 144, facilitating proper indicator needle 134 placement. Specifically, the stepper motor 166 is placed in the center of the housing 144 so that the rotor shaft 136 and the indicator needle 134 are located at the center of the gauge face 124. The stepper motor 166 is electrically wired to the control unit 154 by a wire 168. This allows the stepper motor 166 to receive a digital input, i.e., drive commands, and power directly from the control unit 154. The stepper motor 166 receives drive commands from the control unit 154 that commands the stepper motor 166 how far, and in what direction, to rotate the rotor shaft 136, and subsequently the indicator needle 134. Specifically, the stepper motor 166 is signaled how many "full steps" to rotate the rotor shaft 136, such command being in the form of electrical pulses. The number of steps required for a desired rotation is based on the type of stepper motor 166 incorporated in the invention. In one embodiment, the stepper motor 166 is a permanent magnet stepper motor that has a large full step angle of 45° or 90°. In another embodiment, the stepper motor 166 is a variable reluctance stepper motor that has a smaller full step angle of around 15°. In still another embodiment, the stepper motor 166 is a hybrid stepper motor that has a full step angle of as low as 0.9°. It is even further contemplated that the stepper motor 166 includes a driver and various step modes, including, half-step and micro-step. A half-step designation simply means that there are two partial-steps for every full step and thus the stepper motor requires two times the normal number of steps to make a full rotation. A micro-step designation means that the full step is further subdivided, and in some instances is capable of rotating at 1/256 of a full step.

The power supply 150 provides power directly to the pressure sensor 152 and the control unit 154 through a power wire 148, which splits into two wires 148a, 148b wired to the control unit 154 and the pressure sensor 152, respectively. In various embodiments, the power supply 150 is a battery external to the system, or incorporated into the pressure gauge 102, or the HVAC manifold system 100. In another embodiment, the power supply 150 includes a solar array associated with a rechargeable battery. In this embodiment, the solar array functions to provide power to the pressure sensor 152 and the control unit 154, as well as to recharge the battery. In still another embodiment, the power supply 150 is an AC power supply and includes one or more AC to DC converters for supplying various voltage levels to the pressure sensor 152 and the control unit 154.

Figure 7:
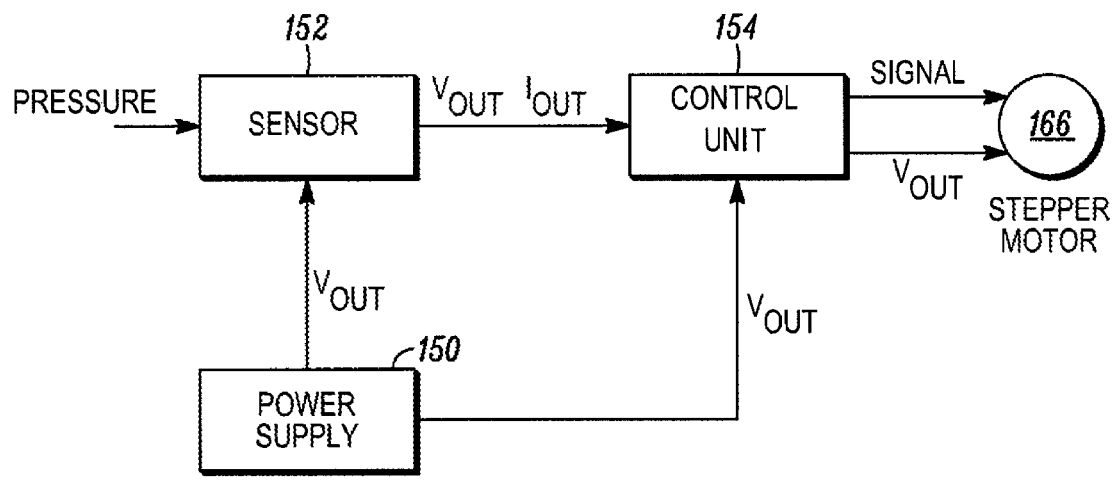
FIG. 7 is a block diagram of an electrical system embodying the present invention.

Referring to FIG. 7, a block diagram of the electronic components of the present invention is shown. As shown, the power supply 150 delivers power ($V_{out}$) to both the pressure transducer 152 and the control unit 154, while the control unit 154 delivers power ($V_{out}$) to the stepper motor 166. The pressure transducer 152 experiences a pressure input that results in a signal output ($V_{out}$, $I_{out}$) representative of the pressure measured. The signal output from the pressure transducer 152 is one of, as shown, a voltage ($V_{out}$) or a current ($I_{out}$), as discussed above. The control unit 154 receives the signal output from the pressure sensor 152 and converts it into a signal, or drive command. The control unit 154 then outputs the drive command (SIGNAL) and voltage ($V_{out}$) to the stepper motor 166 to control rotation thereof. The stepper motor 166 receives the drive command from the control unit 154 and operates in accordance thereto.

In operation, the power source 150 provides power to the pressure sensor 152, the control unit 154, and the stepper motor 166 (by way of the control unit 154). The supplied power allows for the devices to function properly. The low-pressure gauge 104 is connected to the manifold chamber 102 by the gauge fitting 138. This connection places the low-pressure gauge 104 in fluidic communication with the HVAC or other system. Specifically, the fluid of the system can travel through the manifold chamber 102, through the gauge fitting 138 and contact the pressure sensor 152. The pressure sensor 152 measures the pressure of the system and outputs a signal indicative of that measurement to the control unit 154. The control unit 154 receives the signal and converts it into a command for the stepper motor 166. Specifically, the control unit 154 takes the signal received by the pressure sensor 152 and determines a direction and required amount of steps for the stepper motor 166 to rotate the rotor shaft 136 in order to indicate the pressure (or other measured characteristic) on the gauge face 124. The control unit 154 then outputs the drive command to the stepper motor 166, which receives the command and rotates the rotor shaft 136 accordingly. The rotor shaft 136 rotates according to the stepper motor 166, thus rotating the indicator needle 134 and placing it in the appropriate location matching the system pressure. As shown in FIG. 3, the gauge face 124 includes a plurality of scales, including a PSI scale 128. The indicator needle 134 is rotated, clockwise or counter-clockwise, until it indicates the proper system pressure, whereby a technician can determine the refrigerant temperature therefrom. As such, the present invention combines the functionality and accuracy of a digital gauge with the visual benefits of an analog gauge.

As may be recognized by those of ordinary skill in the pertinent art based on the teachings herein, numerous changes and modifications may be made to the above-described and other embodiments of the present invention without departing from its scope as defined in the appended claims. For example, embodiments described herein refer to HVAC system gauges, but the present invention can be used with any of numerous different types of gauges and systems that are currently known or that later become known. This includes high-pressure gauges as well as gauges from fields other than HVAC, e.g., automotive gauges. Accordingly, this detailed description of currently preferred embodiments is to be taken in an illustrative as opposed to a limiting sense.

What is claimed is:

1. A gauge, comprising:
   a housing;
   a fitting having an inlet, an internal flow path, and an outlet;
   a sensor in fluidic communication with the internal flow path, the sensor adapted to measure a characteristic of a fluid in fluidic contact therewith and output a signal representing the value of the measured characteristic;
   a control unit in signal communication with the sensor, the control unit adapted to receive the output from the sensor and output a command signal based on the output of the sensor;
   a stepper motor adapted to rotate a rotor shaft, the stepper motor in signal communication with the control unit;
   a power supply in electrical communication with the sensor and the control unit; and
   an indicator needle mounted to the rotor shaft;
   wherein the control unit transmits the command signal to the stepper motor;
   wherein the stepper motor receives the command signal from the control unit and drives the rotor shaft according to the command signal.

2. The gauge as defined in claim 1, wherein the sensor output is an analog signal.

3. The gauge as defined in claim 2, wherein the control unit is adapted to convert the analog signal to a digital signal.

4. The gauge as defined in claim 1, wherein the control unit is a microcontroller.

5. The gauge as defined in claim 4, wherein the microcontroller includes memory.

6. The gauge as defined in claim 4, wherein the microcontroller includes an executable program.

7. The gauge as defined in claim 1, wherein the command includes a drive direction.

8. The gauge as defined in claim 1, wherein the sensor includes a strain gauge.

9. The gauge as defined in claim 8, wherein the strain gauge is a piezoresistive strain gauge.

10. The gauge as defined in claim 1, wherein the sensor is an electromagnetic sensor.

11. The gauge as defined in claim 1, wherein the sensor is a piezoelectric sensor.

12. The gauge as defined in claim 1, wherein the sensor output is a voltage.

13. The gauge as defined in claim 12, wherein the sensor output is a voltage within the range of 0-5 volts.

14. The gauge as defined in claim 12, wherein the sensor output is a voltage in an amount of millivolts.

15. The gauge as defined in claim 1, wherein the sensor output is a current in an amount of milliamps.

16. The gauge as defined in claim 1, wherein the power supply is a battery.

17. The gauge as defined in claim 16, wherein the battery is rechargeable.

18. The gauge as defined in claim 1, wherein the power supply is an AC power supply.

19. The gauge as defined in claim 1, wherein the power supply further comprises a solar array.

20. The gauge as defined in claim 19, further comprising a rechargeable battery in electrical communication with the solar array, wherein the solar array is adapted to charge the rechargeable battery.

21. The gauge as defined in claim 1, wherein the stepper motor is a permanent magnet stepper motor.

22. The gauge as defined in claim 1, wherein the stepper motor is a variable reluctance stepper motor.

23. The gauge as defined in claim 1, wherein the stepper motor is a hybrid stepper motor.

24. The gauge as defined in claim 1, wherein the stepper motor includes a driver.

25. The gauge as defined in claim 1, wherein the stepper motor defines a step angle of less than 2°.

26. The gauge as defined in claim 1, wherein the stepper motor defines a step angle within the range of 5° to 10°.

27. The gauge as defined in claim 1, wherein the stepper motor defines a step angle within the range of 10° to 45°.

28. The gauge as defined in claim 1, wherein the stepper motor defines a step angle of greater than 45°.

29. The gauge as defined in claim 1, wherein the fitting includes external threading.

30. The gauge as defined in claim 1, wherein the sensor comprises at least one of a pressure sensor, a temperature sensor, a force sensor, a humidity sensor, a photo optic sensor, a torque sensor, a vibration sensor, a fluid viscosity sensor, a fluid density sensor, a sound sensor, and a light sensor.

31. The gauge as defined in claim 1, wherein the gauge is a HVAC low-pressure gauge.

32. The gauge as defined in claim 1, wherein the gauge is a HVAC high-pressure gauge.

* * * * *